Nov. 4, 1930.                    D. SCHATZ                       1,780,603
              DEVICE FOR MECHANICALLY DETERMINING AND INDICATING
                       THE DEGREE OF USAGE OF A MECHANISM
                          Filed Nov. 16, 1928            6 Sheets-Sheet 1

INVENTOR:
Desiderius Schatz
BY: Ruey, Boyer + Bakelar
ATTORNEYS

Nov. 4, 1930.  D. SCHATZ  1,780,603
DEVICE FOR MECHANICALLY DETERMINING AND INDICATING
THE DEGREE OF USAGE OF A MECHANISM
Filed Nov. 16, 1928  6 Sheets-Sheet 2

INVENTOR:
Desiderius Schatz
BY: Ruy, Boyce Bakelev
ATTORNEYS

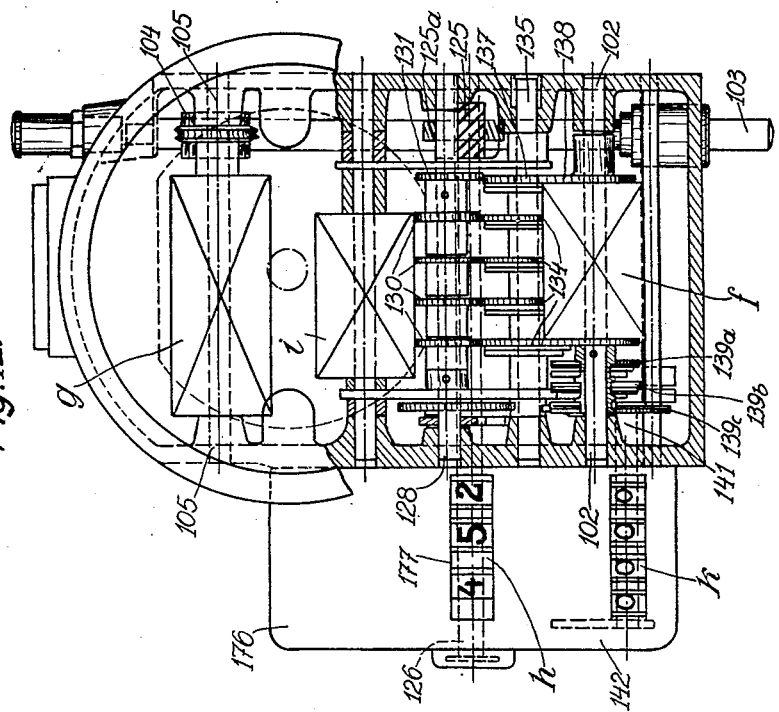

Nov. 4, 1930.  D. SCHATZ  1,780,603
DEVICE FOR MECHANICALLY DETERMINING AND INDICATING
THE DEGREE OF USAGE OF A MECHANISM
Filed Nov. 16, 1928    6 Sheets-Sheet 4

INVENTOR:
Desiderius Schatz.
BY: Ruege, Boyce & Bachelor
ATTORNEYS

Nov. 4, 1930.  D. SCHATZ  1,780,603
DEVICE FOR MECHANICALLY DETERMINING AND INDICATING
THE DEGREE OF USAGE OF A MECHANISM
Filed Nov. 16, 1928  6 Sheets-Sheet 5
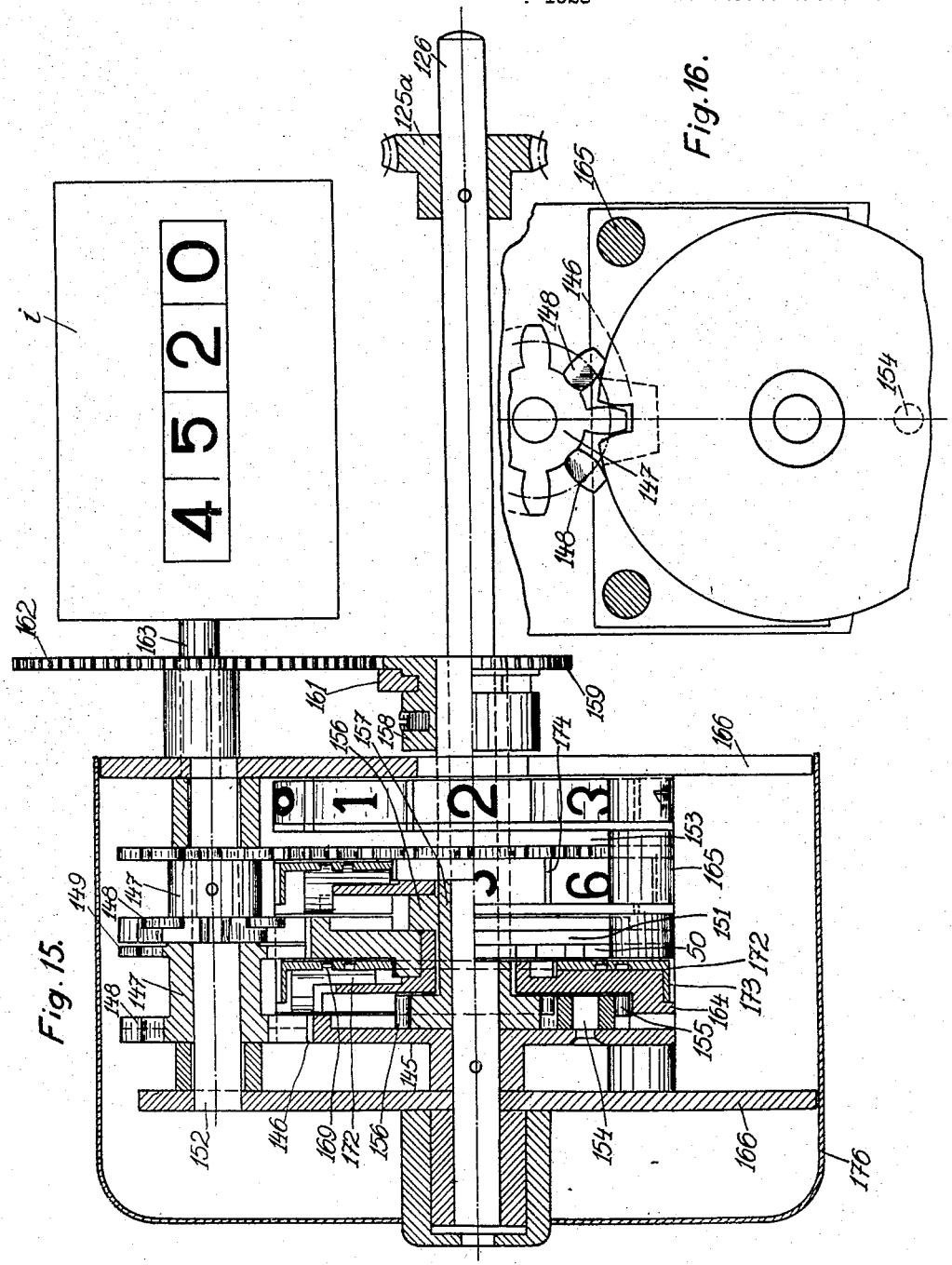
INVENTOR:
Desiderius Schatz
BY: Reeg, Boyer+Bakelar
ATTORNEYS Nov. 4, 1930.                D. SCHATZ                  1,780,603
         DEVICE FOR MECHANICALLY DETERMINING AND INDICATING
                THE DEGREE OF USAGE OF A MECHANISM
                    Filed Nov. 16. 1928         6 Sheets-Sheet 6

INVENTOR:
Desiderius Schatz.
BY: Reeges, Boyer + Bakelan
ATTORNEYS.

Patented Nov. 4, 1930

1,780,603

UNITED STATES PATENT OFFICE

DESIDERIUS SCHATZ, OF ZITTAU, GERMANY

DEVICE FOR MECHANICALLY DETERMINING AND INDICATING THE DEGREE OF USAGE OF A MECHANISM

Application filed November 16, 1928, Serial No. 319,882, and in Germany May 28, 1925.

As regards works management and supervision an important part is played by the question of usage of the separate machines. In this connection the determination of quantitative efficiency is of considerable importance, i. e. the determination as to how many of the possible operative movements of a machine have been actually carried out in a useful manner in the course of a predetermined period of time, as for example during the duration of a working shift. This requirement is of considerable value in the operation of weaving where it is of importance to determine the output of the loom, that is to determine to what extent the operator has fulfilled his obligations. This is effected by counting or determining the number of actual wefts thrown and for this purpose so-called weft counters are known which are always visible and serve to give the operator a certain knowledge of the number of wefts thrown.

In weaving, this definite and clear determination of the number of wefts thrown is also of importance in that the number of wefts thrown may form the basis of the calculation of wages. The maximum output being known for each loom it is possible to determine, from the actual number of wefts thrown, the extent to which the loom has been used. It is therefore usual and in weaving works it has been the custom to calculate and fix this degree of usage in percentages.

Hitherto this calculation has required inconvenient and tedious labour, whilst errors were not excluded. The object of the present invention is to eliminate these errors and the general solution resides in the fact that the degree of usage is ascertained mechanically by reading the degree in question directly from a scale after the lapse of a predetermined period of time.

In carrying the invention into effect I provide an indicating device which indicates the difference between the number of operations (e. g. wefts thrown) theoretically obtainable in a selected period of time and the number of operations actually carried out in said period of time, said indicating device being actuated from a device which is influenced by the actual operations, through the intermediary of a transmission gear. This gear is preferably adjustable to vary the transmission ratio for different maximum degrees of usage of the mechanism, e. g. of the loom.

A further improvement and modification of the device, according to the present invention, resides in the fact that there may also be provided a device, operating in the manner of a calculating machine for determining and indicating the wages due at any time and which is preferably driven from the main shaft, which latter in additon to the device for indicating the maximum degree of usage also drives a weft counter with indicating mechanism so that it is possible at any time to read off and ascertain the number of wefts thrown and the corresponding wages and at the end of the prescribed period also the efficiency of the loom or other machine.

In addition to these devices there may be provided according to the invention, a device which continuously adds together the wages due and renders visible the sum due at any time, the feed movement of the wages calculator being effected after say 100 operative movements or shuttle throws, whereas continuous counting of the wages only takes place after say 1000 operations. The wages calculator operates to an accuracy of say one pfennig. Weft counters in combination with counting devices for wages based on the number of throws are already known. In these counting devices stepped rollers are used for driving the wages calculating mechanism.

A further feature of the invention is that I may provide a novel calculating device for the wages calculator, which device however may be used for other purposes such as to effect multiplications. The calculating device or wages calculator operates according to the known stepped wheel principle. In comparison with the known systems the novelty resides in the fact that the part carrying the steps is stationary and the feed rolls or feed wheels of the driving mechanism are provided with a feed device (rotary gear), which at each revolution of the feed rolls comes successively into engagement with the adjusted steps and sets the counting mechanism of the indicating device in operation. In the known calculating machines this arrangement differs in so far as the part carrying the steps is rotatable and its steps operate in the manner of ratchet teeth.

In the accompanying drawings are illustrated two forms of construction in accordance with the invention.

Figs. 11–18 show the device in combination with a wages calculator.

Fig. 11 is a central sectional elevation.

Fig. 12 is a front elevation, partly in section of the whole arrangement according to one form of the invention.

Fig. 13 shows the device for driving the pointer of the device for determining the degree of usage.

Fig. 14 is a view of the dial.

Figs. 15–18 show the driving mechanism of the wages calculator to a larger scale.

Fig. 15 is a front elevation, partly in section of the complete driving mechanism.

Fig. 16 is a side elevation of the driving feed wheel.

Fig. 17 is a side elevation of the spoke carrier, and

Fig. 18 is a side elevation of the adjusting device for the spokes.

Figure 3:
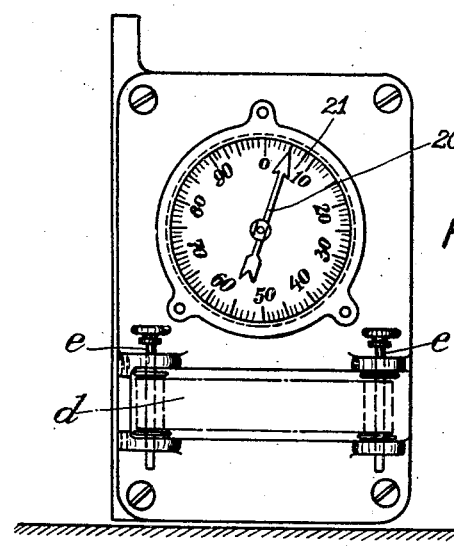
Fig. 3 is a front elevation with the front wall.

In the lower half of a casing 1 (Fig. 1) is provided a printing device. The device consists of a handle $a$, carrying a printing pad $b$ and subjected to the action of a spring $c$. In front of the printing pad is located an inking band $d$ which is wound in the known manner on rollers $e$ (Fig. 3). $f$ indicates type wheels mounted on the shaft 2 and provided in known manner with a "tens" advancing device. Between the inking band and the type wheels is provided a paper strip or the like $g$, on which is made a print of the setting of the type wheels.

Parallel to the shaft 2 there is mounted in the casing 1 a driving shaft 3, connected to one of the type wheels and driven from one of the loom shafts. On the shaft 3 is keyed a toothed wheel 4 which gears with a toothed wheel 6 loosely mounted on the main shaft 5 of the measuring device. The shaft 5 is mounted in lugs 7 and 8 of the casing and on one side projects outwardly at 9 so that it can be rotated from the outside by means of a key fitted over a projection 10 on the shaft 9.

To the lug 7 inside the casing there is secured a plate spring 11 bearing against the toothed wheel 6 and pressing this against a disc 12 keyed to the shaft 5 so that a friction clutch is provided between the toothed wheel 6 and the disc 12 and thus between the shaft 3 and the shaft 5.

Figures 1, 2:
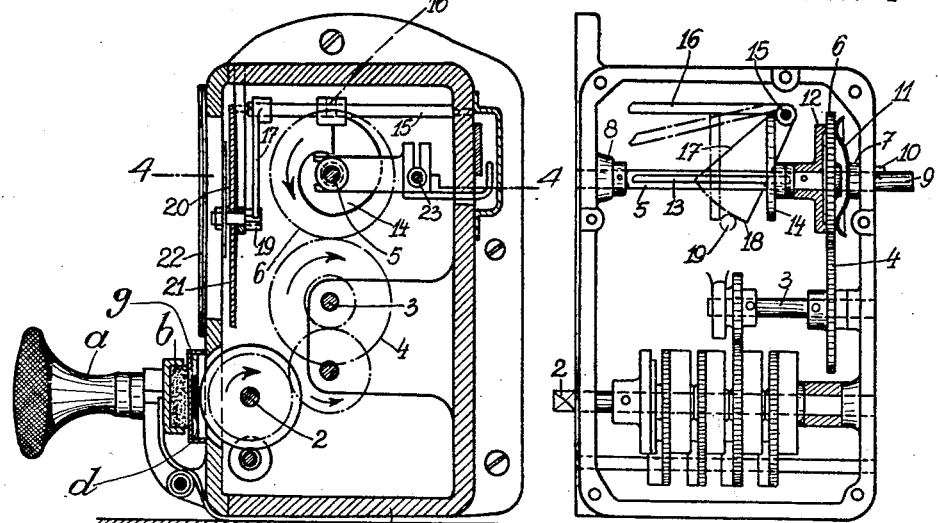
Fig. 1 is a vertical section.
Fig. 2 is a front elevation with the front wall removed.

On the shaft 5 there is also mounted a disc 14, movable longitudinally on a suitable keyway 13 but rotatable with the shaft 5 and of which the shape is in the form of a spiral as shown in Fig. 1. Against the outer edge of disc 14 there bears a single armed lever 16, rotatably mounted inside the casing 1 on a shaft 15, whereby, if necessary, provision is made, by means of a spring not shown, that this engagement takes place continuously and under all circumstances. On the shaft 15 is also keyed a segment 17 which is toothed at its lower end and gears with a pinion 19 to which is connected a pointer 20 moving over a scale 21. This scale is located in the casing 1 behind a window 22 and, as shown in Fig. 3, is thus visible from the outside as is the pointer 20.

Figure 4:
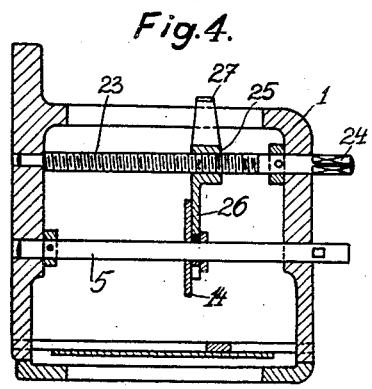
Fig. 4 is a cross section on the line 4—4 of Fig. 1.

Parallel to the shaft 5 there is mounted in the casing a screw spindle 23 which at one end also projects from the casing 1 and at its outer end is for example provided with a portion of square section 24 (Fig. 4) so that it can be rotated from the outside. On the spindle 23 may move a nut 25 which by means of an arm 26, secured thereto, engages with the disc 14 and at its opposite side carries a pointer 27 adapted to move in front of a scale 28 provided on the rear side of the device. By rotation of the square portion 24 the nut 25 is moved on the spindle 23 and thus the disc 14 on the shaft 5 is moved simultaneously along the lever 16.

The method of operation of the device is as follows:—

Figure 5:
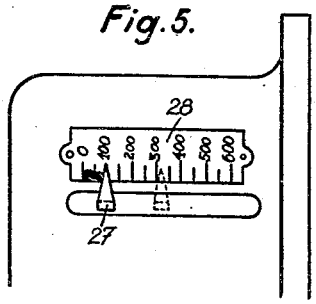
Fig. 5 is a partial rear elevation of one form of construction of the subject of the invention.
Figure 10:
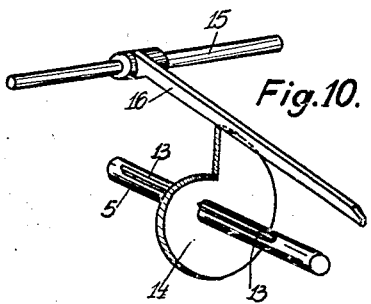
Fig. 10 shows a perspective view of a part used in connection with the first form of construction.
Figure 6:
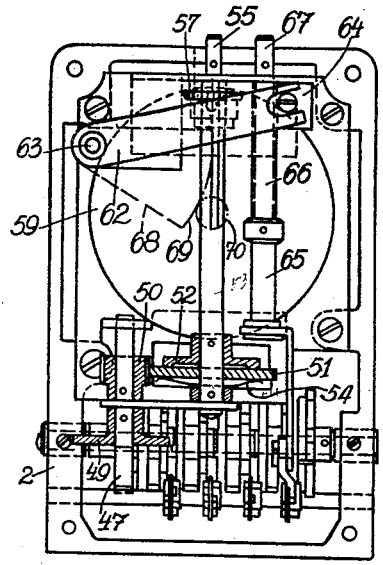
Fig. 6 is a longitudinal section on the line 6—6 of Fig. 7.

Assuming that the theoretically obtainable number of weft throws within a period of time for which the device is arranged, for example a whole working week, is about 500,000, the shaft 23 must first be so rotated that the pointer 27 is opposite the part of the scale 28 (Fig. 5) marked 500. This position of the pointer corresponds with a predetermined position of the disc 14 relatively to the ends of its shaft 5. On the axial movement of the disc 14 there is also moved the lever 16, bearing against the spiral surface thereof, which produces a rotation of the pointer 20. By adjusting the disc 14 by rotation of the shaft end 9, the shaft 5 and thus the disc 14 are therefore turned until the pointer 20 is again at zero.

The transmission ratio between the loom shaft and the pointer is dependent on the position of the disc 14. The more this disc is moved to the left, Fig. 2, the smaller will be the transmission ratio. Consequently the higher the usage figure of the particular loom, when therefore dealing with a larger number of effective throws, the more must the disc 14 in Fig. 2 be moved to the left and thus the pointer in Fig. 5 moved to the right, as with a smaller transmission ratio there corresponds to a larger angular movement of the toothed wheel a smaller movement of the segment 17 than with a large transmission ratio. An intermediate position of the disc 14 and of the lever 16 is shown in chain dotted lines in Fig. 2.

The position of the disc 14 relatively to the ends of the shaft 5 then remains unchanged. A rotation of the shaft 5 only takes place when the loom is started.

The shaft 5 is rotated by the printing device which in turn is set in operation by the throw counter, by rotating through the medium of the shafts 2, 3 the toothed wheel 6 which bears frictionally against the disc 12.

If after the period of measuring, say after a working week, 500,000 throws have been effected the disc 14 will have made a complete revolution and pointer 20 will again be opposite the figure 0 of the scale 21, corresponding with an efficiency of 100%.

If the actual number of throws in a working week is less the disc 14 will not make a complete revolution so that the pointer 20 will stop before reaching the zero position. If when reading off at the end of the working week it stood, for example opposite the number 80 this would indicate that the efficiency was 80%. It is to be understood that a reading can be only taken at the end of a period of measuring for which the apparatus is constructed.

Figure 7:
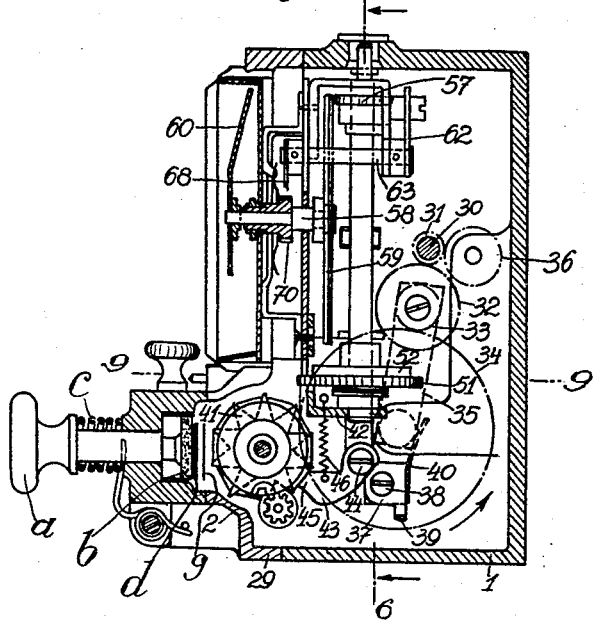
Fig. 7 is a longitudinal section arranged at 90° relatively to Fig. 6.
Figure 8:
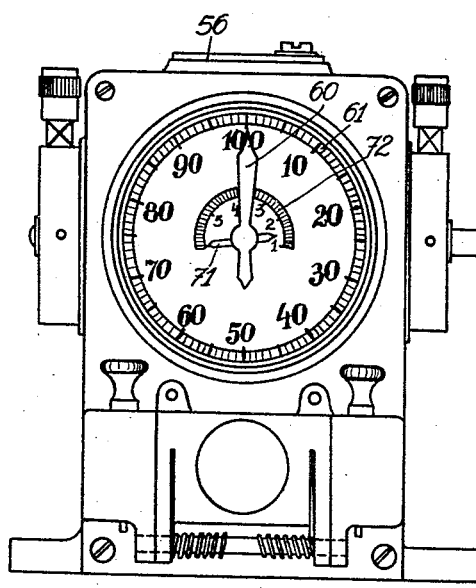
Fig. 8 is a front elevation.
Figure 9:
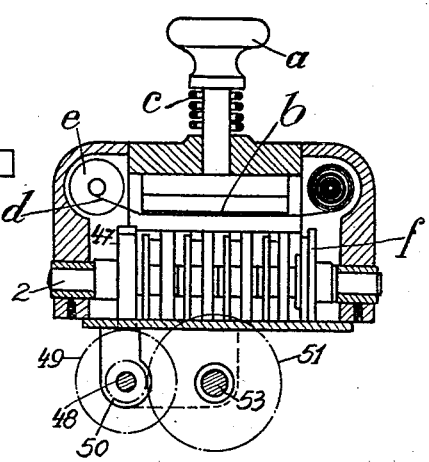
Fig. 9 is a cross section of the front portion on the line 9—9 of Fig. 7 of second form of construction of the subject of the invention.
Figure 13:
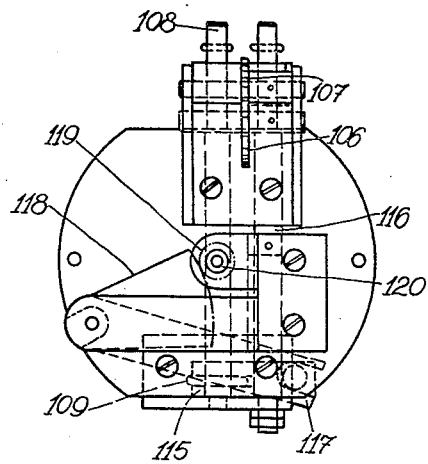
Figure 14:
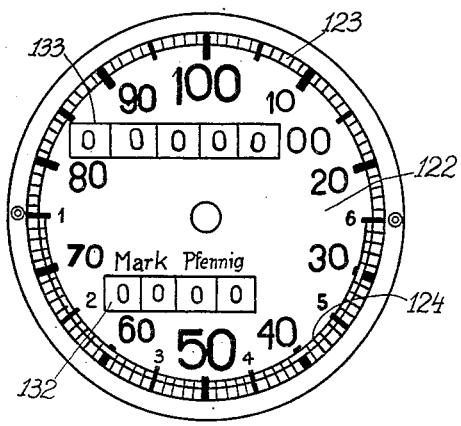
Figure 17:
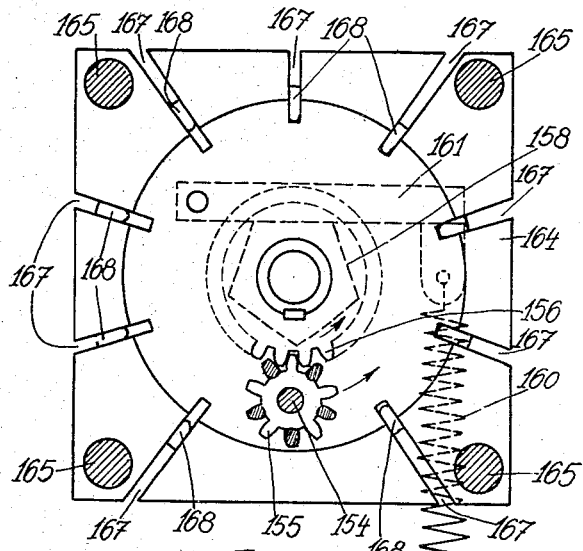
Figure 18:
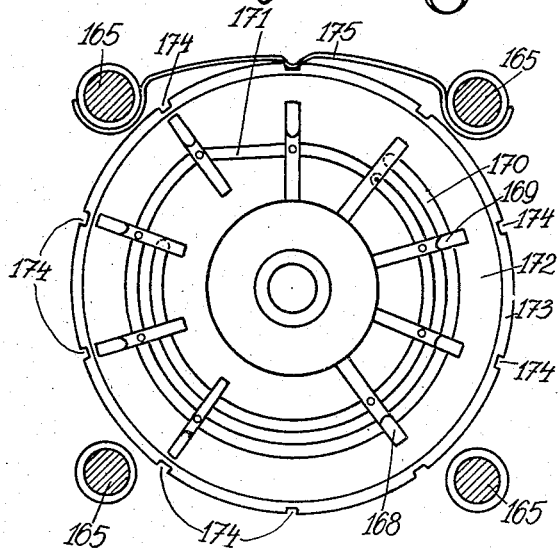

In Figs. 6 to 9, 1 is again the casing in the front portion 29 of which is mounted the shaft 2 of the counting mechanism. 30 is the main driving shaft on which is mounted a toothed wheel 31 which rotates the main driving wheel 34 of the counting mechanism through the gear train 32, 33. The transmission to the counting mechanism, as hereinafter described, is such that transmission only takes place when the wheel 34 is rotated in the direction indicated by the arrows. In order that this direction of rotation may be ensured in all cases, irrespective of the rotation of the driving shaft 30 to the left or to the right, the gear train 32, 33 is mounted on an arm 35 which is pivotally mounted on the shaft of the wheel 34. The wheel 32 can consequently be brought into engagement with an intermediate wheel 36 which in turn is continuously in gear with the wheel 31. The intermediate wheel 36 is brought into engagement with the gear train by moving the arm 35 from the position shown in Fig. 7 to the right if the direction of rotation of the shaft 30 deviates from the normal direction of rotation. Consequently the apparatus may be applied to any machine independently of its direction of rotation.

The wheel 34 carries a driver 37 rotatably mounted on a shaft and provided with a feed tooth 39 and a spring 40. The driver 37 bears at one end against the hub of the wheel by means of the spring 40. When the wheel 34 turns in the direction of the arrow, the driver, by means of the tooth 39, engages with the star wheel 41 and moves this, whereas in the reverse direction of rotation the tooth 39 moves backwardly against the action of the spring 40 so that a movement of the wheel 41 does not take place during rotation in this direction. In order to provide for further locking in this direction and at the same time to feed the wheel 41 always by a predetermined constant amount, as required by the normal position of the type wheel relatively to the printing surface, a pawl 43 is pivotally mounted at 44 in the interior of the casing of a frame 42. The tooth 45 of the pawl engages between two teeth of the wheel 41 and is held in this position by a spring 46. This pawl allows the wheel 41 to be moved only in one particular direction in the manner above described, as the tooth 45 yields against the action of the spring 46 and after movement engages with the next tooth space and thus moves the star wheel into the normal position.

The star wheel 41 is provided, in the usual manner, on its periphery with ten spaces which are arranged to correspond with the numbers 1–10. In known manner there is produced at each revolution the movement of the adjacent type wheel, as is known in connection with counting mechanisms.

On the opposite end of the shaft 2 is keyed a worm wheel 47 which gears with a toothed wheel 49 keyed to the shaft 48 and thus drives this. On the same shaft is mounted a toothed wheel 50 gearing with a toothed wheel 51 frictionally engaging with a disc 52 mounted on the shaft 53 extending vertically through the casing 1 and pressed against the toothed wheel 51 by a plate spring 54. The shaft 53, similar to the shaft 5 in Fig. 2, is extended through the casing wall and terminates in a member 55 by means of which it is possible, after opening a closure 56, to reset the shaft 53 from the outside as above described in connection with the shaft 5 in the first form of construction.

On the shaft 53 is slidably but non-rotatably mounted a friction wheel 57 which co-operates with a large friction disc 59 keyed to the horizontal shaft 58 and rotates this, the transmission ratio being, in the known manner, dependent on the distance of the friction wheel 57 from the centre point of the disc 59. The shaft 58 has keyed to its front end a pointer 60 moving in front of a scale, indicating the degree of usage, in a similar manner as above described in connection with Fig. 3.

The longitudinal movement of the friction wheel 57 on the shaft 53 is effected by means of a single armed lever 62 rotatably mounted at 63 and having its forked end engaging a nut 64 which can be moved on the rotation of a spindle 65 mounted on the casing parallel to the shaft 53. The spindle 65 similar to the spindle 23 in the first form of construction, is provided with a screw thread 66 and is extended to the outside so that the end 67 can be moved from the outside after opening the closure 56. The lever 62 engages with the friction wheel 57 and thus moves this on the shaft 53 as soon as the nut 64 is moved by rotating the member 67.

Seated on the same shaft 63 as the lever 62 and connected thereto is a segment 68 which thus partakes of the oscillatory movement of the lever 62. The segment 68 is provided on its front face with teeth 69 which gear with a gear train 70, rotatably mounted on the pointer shaft 58, which is extended forwardly in the form of a bush and is coupled to a pointer 71, moving in front of a scale 72 provided on the same dial as the scale 71. The position of friction wheel 57 is thus indicated at any time by means of the pointer 71 on the scale 72 and the transmission ratio between the loom shaft and the pointer 60 can be set by adjustment by means of the member 67 in as similar manner as described in connection with the scale 28, in the first form of construction.

The method of operation of the apparatus just described is substantially the same as that described in connection with the preceding form of construction.

After opening the closure 56 the spindle 65 is first turned until the pointer 71 (Fig. 8) is opposite the division of the scale 72 corresponding with the theoretically obtainable number of throws.

If for example this number is 400,000 in a working week then the pointer 71 must be set opposite 4.

The rotation of the spindle 65 produces a vertical movement of the nut 64 screwed on the screw 66.

The movement of the nut 64 produces an oscillation of the lever 62 which turns the pointer 71 through the segment 68, 69 and the toothed wheel 70.

At the same time the lever 62 also moves the friction wheel 57 relatively to the friction disc 59 into a position which produces a transmission ratio between the friction wheels 57, 59 corresponding with the theoretically obtainable number of throws. The friction wheel 57 remains in this position during the measurement. As soon as the loom is started the shaft 53 and the friction disc 59, with which the pointer 60 rotates, are rotated by the counting and printing mechanisms.

If within the working week or other period of time, for which the apparatus has been set, 400,000 throws are actually effected, the friction disc, by reason of the correspondingly adjusted transmission ratio between the friction wheels, makes a complete revolution. If the number of throws is less the friction disc does not make a complete revolution and the reading at the end of the period of measuring indicates the actual degree of usage. In this case also the reading is made at the end of each measuring period.

In the form of construction according to Figs. 11-18 the printing device $a$ is provided in the lower half of the casing as above described.

In the casing 101 there is also mounted a vertical spindle 103, hereinafter referred to as the main shaft, which is driven in a manner not illustrated, by a device for measuring the separate operations for example the number of throws. The rotation of the main shaft 103 is transmitted by means of a worm gear 104 to the device shown diagrammatically at $g$ for indicating the number of throws and constructed in known manner for this purpose and mounted on the shaft 105. The rotation of the shaft 105 is transmitted by a gear train 106, 107 to the vertical spindle 108, which carries the driving wheel 109 of the friction gear of the device already above described for determining the efficiency. For this purpose there is provided on the shaft 108 a toothed wheel 110, gearing with the toothed wheel 107, which is connected to the shaft 108 by the friction clutch 111. The friction wheel 109 drives the large friction wheel 112 mounted on the shaft 113 of the pointer 114. The adjustment of the transmission ratio of the friction gear is effected by mounting the friction wheel 109 on a carrier 115 screwed on a screw spindle 116, arranged parallel to the spindle 108, so that by turning the shaft 116 it is possible to alter the position of the friction wheel 109. The movement of the friction wheel 109 or its support 115 is transmitted to a lever 117 which engages with a toothed segment 118. The toothed segment 118 gears with a toothed wheel 119 mounted on the hollow shaft 120 of the pointer 121.

The two pointers 114 and 121, move in front of a dial 122, covered on the outside by a glass plate, the pointer 114 co-operating with the scale 123 to indicate the percentage efficiency, whilst the pointer 121 co-operates with the scale 124 of which the divisions are marked with the numbers 1, 2, 3, 4, 5 and 6. The adjustment of the pointer 121 is effected, as above described, in such a manner that by turning the screw spindle 116 the pointer 121 is turned until it is opposite the division mark on the scale which corresponds with the theoretically possible number of operations (throws) during a selected period of measurement. If for example it were possible to effect 500,000 throws on a loom in a working week it would be necessary to set the pointer 121 opposite the number 5 on the scale 124.

The rotation of the shaft 103 is transmitted, by screw gear 125 or the like to the shaft 126 of the wages calculator hereinafter described. The wages calculator $h$, as hereinafter described, drives a toothed wheel 127 gearing with a toothed wheel 129 keyed to the shaft 128. A row of toothed wheels 130 are loosely mounted on, and a toothed wheel 131 is keyed to the shaft 128. The toothed wheels 130 gear with other toothed wheels carrying the numeral wheels of a wages adding pointer shown diagrammatically at $i$ of which the setting, produced according to the operation of the wages calculator $h$, is visible in the inspection aperture 132 provided in the dial 122. The setting of the device $g$ for indicating the number of throws is rendered visible from the outside through the inspection aperture 133 of the dial 122. Each toothed wheel 130 meshes with a toothed wheel 134 loosely mounted on the shaft 135 of a zero setting device of known construction. The shaft 135 of the zero setting device is provided for each toothed wheel 134 with a zero setting tooth, not shown, extending through the hub of the toothed wheel, which, by axial movement of the shaft 135, is movable into the path of drivers, provided one on each toothed wheel, so that by turning the shaft 135 the drivers of all the toothed wheels can be set in a row and thus all the toothed wheels 134 can be returned into the zero position.

The toothed wheel 131, through the medium of an equally large intermediate wheel 136, drives a toothed wheel 137, loosely mounted on the zero setting shaft 135 and gearing with a toothed wheel 138, keyed to the shaft 102. On the other side of the printing device shown diagrammatically at $f$ and mounted on this shaft, are provided three ratchet wheels $139^a$, $139^b$, $139^c$. The ratchet wheel $139^a$ is keyed to the shaft 102, whilst the ratchet wheels $139^b$ and $139^c$ are loosely mounted thereon. Between the ratchet wheels $139^a$ and $139^b$ or $139^b$ and $139^c$ is provided a transmission mechanism of the type of the known "tens" transfer mechanism so that a revolution of the ratchet wheel $139^a$ produces a tenth of a revolution of the ratchet wheel $139^b$, whilst a revolution of the ratchet wheel $139^b$ produces a tenth of a revolution of the ratchet wheel $139^c$. The ratchet wheel $139^c$ drives a toothed wheel 140 mounted on the shaft 141 of a counting mechanism $k$. The ratio between the shaft 2 and the shaft 141 is therefore 1 : 100.

The counting mechanism $k$ is mounted in the same casing 142 as the driving mechanism of the wages calculator and serves for the continuous addition of the wages amounts indicated by the wages indicator.

Whereas a result on the wages indicator $i$ is obtained in the course of 100 operations and the indication of the wages amount is effected accurately say to a pfennig movement of the wages adding mechanism $k$ is effected after 1,000 throws, the indication being correct to 10 pfennigs.

The toothed wheels 134 gear with the toothed wheels, not shown, of the printing device $f$, carrying the type wheels, so that the setting of the wages indicator $i$ and of the printing device $f$ are effected in synchronism.

The wages calculator or its driving mechanism is illustrated in Figs. 15–18. On the shaft 126 are mounted the worm wheel $125^a$, gearing with the worm wheel 125 on the main shaft 103, and the driving ratchet wheel 145 shown in side elevation in Fig. 16. This ratchet, as is well known in calculating machines, is provided with a ratchet tooth or a single tooth 146 and gears with a double ratchet wheel 147. This double ratchet wheel is provided with ten teeth of which each second tooth 148 is, in known manner, only of half width. The other tooth portion 149 of the ratchet wheel 147, provided with ten teeth, gears with the teeth 150 of the adjacent ratchet wheel 151. This ratchet wheel 151 is also provided with a single tooth and drives a ratchet wheel 147, constructed in the same manner as the ratchet wheel previously described and is freely rotatable therewith on the shaft 152. The arrangement described is a known "tens" transfer device which, as is well known, operates in such a manner that a complete revolution of the driving ratchet wheel 145 corresponding with one tenth of a revolution of the ratchet wheel 151, whilst a complete revolution of the ratchet wheel 151 corresponds with one tenth of a revolution of the third ratchet wheel 153.

On each ratchet wheel 151 there is rotatably mounted, diametrically opposite to the single tooth 146, at 154, a toothed wheel 155 of which each second tooth is again only of half width. The toothed wheel 155 is in engagement with a toothed wheel 156 having twenty teeth. All the toothed wheels 156 are keyed to a hollow shaft 157, surrounding the shaft 126, to which are secured a polygon 158 (Fig. 17) and a toothed wheel 159.

With the polygon 158 co-operates a pawl or locking member 161, acted upon by a spring 160, whilst the toothed wheel 159 gears with a toothed wheel 162 mounted on the shaft 163 of the wages indicator $i$ constructed in the form of a known counting device.

Between the ratchet wheels or ratchet rolls 145 and 151 or 151 and 153 there is provided the following device:

A disc shaped body 164 is connected by stay bolts 165 to the side walls 166 of the casing. In the body 164 are provided nine radial slots 167 in which are mounted and guided hammer shaped spoke teeth 168. Each spoke tooth engages with a projection 169 in a groove 170 which, as will be seen in Fig. 18, consists of two circular grooves, of different diameter, arranged concentrically to the centre of the shaft 126 and connected together by an inclined portion 171. The groove 170 is formed in the vertical wall of an annular body 172 (Fig. 18) of which the outer flange rotatably engages with a corresponding annular flange of the body 164. The annular flange 173 is provided with a number of recesses 174, corresponding with the number of slots 167, between which are marked the numbers 1–9. With the recesses 174 co-operates a locking device 175 formed as a spring. The numbers on the member 172 are visible from the outside through an inspection aperture 177 provided in the casing 176 of the devices described.

The operation of this device is as follows:—

Assuming that it is desired to multiply 452 by 1,000. Firstly the three rollers or bodies 173 provided with numbers must be turned by means of a wedge shaped setting pin, fitted into the recess 174 behind the inspection aperture 177, until the number 452 appears behind the inspection aperture. The rotation of each body 173 produces a rotation of the groove 170 whereby a row of spokes 168 is moved from the position shown at the left of Fig. 18 into the position shown at the right of Fig. 18. In the case of the number in question to be multiplied there are therefore moved in the manner indicated in the spoke row between the ratchet wheels 145 and 151 four spokes in the next five and in the last two, whereby they come into the path of the rotary wheels 155. As soon as the shaft 126 is rotated, there is rotated the driving ratchet wheel 145 and with it the wheel 155, carried thereby, which first runs idly on the toothed wheel 156. Each time the wheel 155 gears by means of one of its wide teeth with an adjusted spoke 168 the wheel 156 is rotated through one fifth of a revolution. After a complete revolution of the driving wheel 145 the wheel, in the example selected, comes successively into gear with four spokes so that the toothed wheel 156 is rotated through four fifths of a revolution. This rotation is transmitted to the wages indicating device $i$. After a complete revolution of the driving wheel 145 there is, however, simultaneously produced, by means of the transfer of tens of the wheel 147, a rotation of the adjacent ratchet wheel 151 through one tenth of a revolution. If the shaft 126 for example, makes 1,000 revolutions this corresponds with 4,000 revolutions of the toothed wheel 159 of which the rotation is transmitted to the wages indicating mechanism $i$. The feed roller 151 only makes one tenth of the number of revolutions of the wheel 145, therefore 100 revolutions, which by reason of the selected setting corresponds with 500 revolutions of the toothed wheel 159. The roller 153 in turn makes one tenth of the revolutions of the wheel 151 therefore 10 revolutions, which by reason of the selected setting corresponds with $2 \times 10 = 20$ revolutions of the toothed wheel 159. There are therefore transmitted to the counting mechanism $i$ 4520 separate movements.

This method of operation is that which takes place in the known spoke wheel calculating machines. The novelty in comparison with these known devices resides in the mounting of the spoke teeth 168 in a stationary spoke member 164 whilst the figure to be multiplied remains visible during operation and the transmission to the counting mechanism is effected by a rotary gear train 155, 156. The figure to be multiplied corresponds for example to the wages due for 1,000 throws.

The device according to the invention has been described with reference to a loom but may also be applied to other machines having repeated operations. For example the device may be driven by the delivery roller of spinning machines and then in addition to the wages there may be determined and printed also the number of hanks or strands. If it appears necessary there may also be effected a printing of the final position of the throw counter.

What I claim is:—

1. Device for indicating the output of machines wherein similar operations are repeated, comprising a device for counting the actual operations and means for indicating the difference between the number of theoretically obtainable operations and the number of operations actually produced in a predetermined period of time, said means being adapted to be driven by the counting device.

2. In a device according to claim 1, a mechanism for producing a printed reproduction of the number of operations completed at any time, and means for transmitting motion to the printing mechanism from the device which counts the operations.

3. In a device according to claim 1, a calculating device for determining and indicating wages in correspondence with the number of actual operations, and means for transmitting motion to the calculating device from the device which counts the operations.

4. Device for indicating the output of machines wherein the same operations are repeated, comprising a counting device for the actual operations, means for indicating the difference between the number of theoretically obtainable operations and the number of actual operations in a predetermined period of time, means for printing the number of operations completed at any time and means for determining and indicating wages in correspondence with the number of actual operations, and means for transmitting motion to said last means from the device which counts the operations.

5. In a device according to claim 1, a calculating device for determining and indicating wages in correspondence with the number of actual operations, said device being driven by the device which counts the operations and means for continuously adding the wages amounts obtained and for indicating at any time the total reached, and means for transmitting motion to the adding means from the wages calculating device.

6. In a device for indicating the output of machines in which the same operations are repeated, a device for counting the number of actual operations, transmission gear actuated by the said counting device, a member actuated by said gear, said member traversing the entire course prescribed for its movement when the theoretically possible number of operations is produced within a predetermined period of time, a scale with which the member actuated by the gear co-operates, and means for varying the transmission ratio in accordance with the theoretical number of operations capable of being produced by the machine in a predetermined period of time.

7. In a device for indicating the output of machines in which the same operations are repeated, a first shaft adapted to be rotated at each operation, a first friction wheel non-rotatable but axially movable on said shaft, a second friction wheel, a second shaft arranged at right angles to the first shaft, said second friction wheel being rotatable on the second shaft and in engagement with the first friction wheel, a pointer on the second shaft, a circular scale having the axis of the pointer as centre, means of moving the first mentioned friction wheel on its shaft and adapted to so adjust the transmission ratio that the pointer, when the theoretical number of operations within the predetermined period of time is obtained, makes a complete revolution.

DESIDERIUS SCHATZ.